(12) United States Patent
Brown et al.

(10) Patent No.: US 12,212,683 B2
(45) Date of Patent: Jan. 28, 2025

(54) PERSISTENT FILE SYSTEM IN A SECURE ENCLAVE

(71) Applicant: R3 Ltd., London (GB)

(72) Inventors: Richard G. Brown, London (GB); Roy Hopkins, London (GB); Qurratul Ain Shams Asari, London (GB)

(73) Assignee: R3 LTD., London (GB)

( * ) Notice: Subject to any disclaimer, the term of this patent is extended or adjusted under 35 U.S.C. 154(b) by 132 days.

(21) Appl. No.: 18/062,526

(22) Filed: Dec. 6, 2022

(65) Prior Publication Data

US 2023/0177197 A1   Jun. 8, 2023

Related U.S. Application Data

(60) Provisional application No. 63/265,018, filed on Dec. 6, 2021.

(51) Int. Cl.
| | |
|---|---|
| H04L 9/32 | (2006.01) |
| G06F 21/54 | (2013.01) |
| G06F 21/60 | (2013.01) |
| G06F 21/62 | (2013.01) |
| H04L 9/08 | (2006.01) |
| H04L 9/40 | (2022.01) |

(52) U.S. Cl.
CPC ............ H04L 9/3242 (2013.01); G06F 21/54 (2013.01); G06F 21/602 (2013.01); G06F 21/6218 (2013.01); H04L 9/0825 (2013.01); H04L 63/1441 (2013.01)

(58) Field of Classification Search
CPC ... H04L 9/3242; H04L 9/0825; H04L 9/0897; H04L 9/14; H04L 63/1441; G06F 2221/2107; G06F 21/53; G06F 21/554; G06F 21/57; G06F 21/575; G06F 21/6209; G06F 21/64; G06F 21/78; G06F 21/54; G06F 21/602; G06F 21/6218
See application file for complete search history.

(56) References Cited

U.S. PATENT DOCUMENTS

| | | | |
|---|---|---|---|
| 10,691,837 B1 * | 6/2020 | Martel | H04L 9/0863 |
| 10,873,454 B2 * | 12/2020 | Murray | H04L 63/20 |
| 2016/0261408 A1 | 9/2016 | Peddada et al. | |
| 2018/0212966 A1 | 7/2018 | Costa | |
| 2020/0259799 A1 | 8/2020 | Li et al. | |
| 2020/0349252 A1 | 11/2020 | Yu et al. | |
| 2021/0273812 A1 | 9/2021 | Hardin et al. | |
| 2023/0076420 A1 * | 3/2023 | Fytraki | H04L 9/088 |
| 2023/0179425 A1 * | 6/2023 | Brown | G06F 21/64 713/168 |
| 2023/0222230 A1 * | 7/2023 | Hopkins | H04L 63/1441 713/171 |

* cited by examiner

Primary Examiner — Han Yang
(74) Attorney, Agent, or Firm — Perkins Coie LLP

(57) ABSTRACT

A secure enclave is hosted by an untrusted host. To securely persist data on the untrusted host, the secure enclave generates or updates a persistent file system, wherein the persistent file system is a collection of logical files. The secure enclave segments the persistent file system into a plurality of sectors. The secure enclave provides a key specification to a key derivation enclave. The secure enclave obtains an encryption key dynamically generated based on the key specification. The secure enclave cryptographically protects each of the plurality of sectors using the key and causes the host to write a plurality of encrypted sectors to a disk as a single physical file.

20 Claims, 17 Drawing Sheets

PERSISTENT FILE SYSTEM IN A SECURE ENCLAVE

PRIORITY CLAIM

This application claims priority to U.S. Pat. App. No. 63/265,018, titled SECURE ENCLAVE TECHNIQUES, filed on Dec. 6, 2021 and incorporated herein by reference in its entirety and for all purposes.

RELATED APPLICATIONS

This application is related to U.S. patent application Ser. No. 18/062,523, titled KEY DISTRIBUTION SYSTEM IN A SECURE ENCLAVE, filed on Dec. 6, 2022 and incorporated herein by reference in its entirety and for all purposes. This application is also related to U.S. patent application Ser. No. 18/062,525, PREVENTING ROLLBACK ATTACKS ON PERSISTED DATA IN A SECURE ENCLAVE, filed on Dec. 6, 2022 and incorporated herein by reference in its entirety and for all purposes.

BACKGROUND

In the field of confidential computing, applications provide enclaves, in which data integrity, data confidentiality and code integrity are assured. This is achieved by ensuring that data in the enclave is protected by hardware through the use of encryption. If an application implemented inside an enclave needs to persist data (for example, in order to evict it from the enclave or to allow state to be reconstructed in the event the enclave is restarted), then the enclave needs to encrypt that data prior to emitting it for storage.

BRIEF DESCRIPTION OF THE DRAWINGS

Detailed descriptions of implementations of the present invention will be described and explained through the use of the accompanying drawings.

Figure 1A:
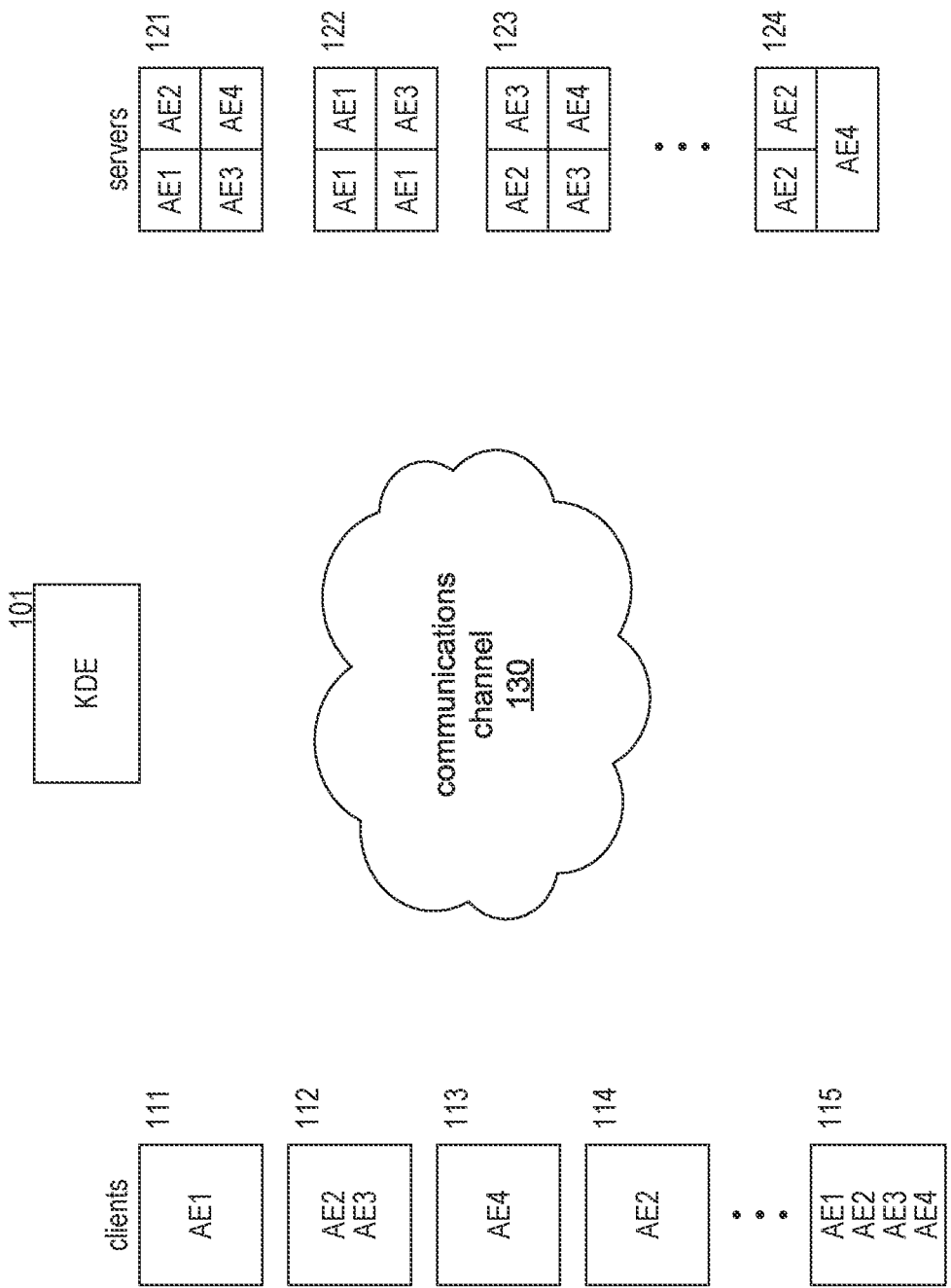
FIG. 1A is a block diagram that illustrates a scenario in which clients and application enclaves (AEs) interact with a key derivation enclave (KDE), according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Secure Enclave Architecture

Some computer architectures provide a Trusted Execution Environment (TEE) for execution of trusted code in a tamper-proof environment. The TEE is implemented as an "enclave", also referred to as a "secure enclave" (SE) or an "application enclave" (AE). The trusted code and its initial data are stored in memory in encrypted form and decrypted when retrieved and stored in enclave-protected memory (EPM) for execution or use. Untrusted code, which is code other than the trusted code, cannot inspect or interfere with the execution of the trusted code, at least without the permission of the trusted code. The TEE thus protects data at rest (within the TEE), in motion (between the TEE and storage), and during computation (within the TEE).

As used herein, the term "application" refers to a program that may include trusted code and/or untrusted code. As a general overview, applications that use a secure enclave are implemented in an environment that has three components, which may be physically and/or logically separate or co-located: clients, hosts, and enclaves.

The term "client" refers to code that interacts with the trusted code. For example, clients can send and receive encrypted messages to and from enclaves by interacting with the host over the network via a suitable communication protocol. In some implementations, an application programming interface (API) specification is provided that specifies the content and/or format of electronic messages transmitted to and from the client.

The term "host" or "host program" refers to an entity that loads an enclave. A host can be an operating system process, computing environment and/or a computing device. A host is generally assumed to be untrusted. In some implementations, hosts provide the enclave with resources (e.g., memory, processor, and the like) but, beyond that, work only with encrypted data. In some implementations, a host can use a Java Virtual Machine (JVM), such as HotSpot.

The term "enclave" refers to a runtime environment and trusted code loaded into a dedicated protected memory space on the host. Code running in an enclave (e.g., applications deployed within an enclave) cannot be tampered with by the host or another entity external to the enclave. Accordingly, an enclave can also be thought of as a region of memory which the CPU blocks access to, running outside of the host. In some implementations, the memory region contains both code and data, which cannot be tampered with. In some implementations, the memory region is encrypted. An enclave communicates with the host by exchanging byte buffers, which can be copied between the host and the enclave using a direct memory copy. In some implementations, the data passing and byte buffers are codified in an API.

An enclave, together with the CPU and, in some implementations, patchable microcode of the CPU, comprises a trusted computing base (TCB). Generally, it is desirable to minimize the size of the TCB in order to reduce the computing overhead of running the secure environment and because more code results in a greater attack surface. To achieve this technical advantage, in some implementations, enclaves are implemented as a native image JVM where bytecode is compiled to native code ahead of time, which reduces the size of and the overhead associated with the JVM that implements the enclave.

The Intel Software Guard Extensions (SGX) and/or the ARM TrustZone are examples of an enclave. In the following, an enclave is described primarily in the context of SGX, although one of skill will appreciate that other implementations are within the scope of the present disclosure.

Secure Enclave Encryption

An enclave includes trusted code and its data and a certificate of the author of the enclave. The certificate is referred to as an Enclave Signature (SIGSTRUCT). The enclave signature includes an enclave measurement, the author's public key, a Security Version Number (ISVSVN) of the enclave, and a Product ID (ISVPRODID) of the enclave. The enclave signature is signed using the author's private key. The enclave measurement is a hash of the trusted code and its initial data. When the code is loaded into protected memory (EPM), the CPU calculates a measurement and stores it in an MRENCLAVE register. If the calculated measurement is not equal to the enclave measurement, the CPU will not allow the enclave to be initialized within the TEE. After the enclave is initialized, the CPU stores a hash of the author's public key in a MRSIGNER register as an identifier of the author. The ISVSVN specifies the security level of the enclave. The ISVPRODID identifies the product the enclave represents. The CPU records both the ISVSVN and ISVPRODID.

A client that is to interact with an enclave (that has been initialized) would typically require the TEE to "attest" to the trusted code and data of the enclave. To provide an attestation to a client that may be executing on platform that is different from the platform of the CPU that is executing the enclave (referred to as "remote" attestation), the TEE generates a "report" that includes the measurement (MRENCLAVE), hash of the author's public key (MRSIGNER), attributes of the enclave, and user data of the enclave. The report is passed to a quoting enclave (QE) to verify and sign the report. When verified, the QE generates a "quote" the includes the report and a signature of the TEE. The quote is then sent to the client.

Upon receiving a quote, the client can verify the signature and if verified, ensure that the report represents the trusted code that the client expects. The signature may be based on an Enhanced Privacy ID (EPID) in which different TEE have different private keys, but signatures based on those private keys can be verified using the same public key. The client may invoke the services of an EPID verification service to verify a signature on a quote.

An enclave that is to interact with another enclave that is executing on the same platform may want the other enclave to attest to its trusted code and data. In such a case, a simplified version of attestation can be used (referred to as "local" attestation). To initiate an attestation, the requesting enclave sends its MRENCLAVE measurement to an attesting enclave. The attesting enclave requests the CPU to generate a report destined to the requesting enclave identified by the MRENCLAVE measurement that it received and sends the report to the requesting enclave. The requesting enclave then asks the CPU to verify the report. The attesting enclave may request the requesting enclave to provide an attestation to effect a mutual attestation.

A TEE provides support for an enclave to encrypt data that is to be stored outside of the TEE and to decrypt the encrypted data when it is later retrieved into the TEE. This encrypting and decrypting is referred to as "sealing" and "unsealing." The TEE generates an encryption key and a decryption key based on a "fused key" that is not known outside of the hardware. The fused key is fused into the CPU hardware during the manufacturing process of the CPU, is not known outside of the CPU not even by the manufacturer, is unique to the CPU, and cannot be accessed except by the hardware. Upon request, the CPU generates a sealing key and unsealing key (e.g., public/private keypair) that is based on the fused key and data associated with the requesting enclave. Thus, each sealing key and unsealing key is unique to the CPU because the fuse keys are unique.

The CPU can generate two types of keys based on the associated data of the enclave that is used when generating the keys. The associated data is the MRENCLAVE (referred to as "sealing to the enclave") or the combination of the MRSIGNER, ISVSVN, and ISVPRODID (referred to as "sealing to the author"). Data that is sealed to the enclave can only be unsealed by an enclave with the same MRENCLAVE value that is executing on the same CPU (i.e., using the same fused key) that generated the sealing key. Data that is sealed to the author can be unsealed by any enclave (e.g., different trusted code) of the author that has the same ISVPRODID and the same or an earlier ISVSVN (specified in a request to seal or unseal) and that is executing on the same CPU (i.e., using the same fused key) that generated the sealing key. (Note: The CPU will not generate seal-to-the-author keys for an ISVSVN that is greater than the ISVSVN of the enclave, which allows for only backward compatibility of sealing.) The TEE provides a seal application programming interface (API) for sealing data and an unseal API for unsealing data.

This approach to sealing and unsealing data presents problems when an enclave is to execute on a different platform and thus with a different CPU from that used to seal data. The executing of enclaves on different platforms is a common occurrence in a cloud computing environment. In such an environment, there is typically no guarantee on which CPU an enclave will execute. Thus, an enclave that seals data when executing on one platform cannot unseal that data when the enclave is restarted on another platform. Also, if a CPU fails, data sealed using that CPU cannot be unsealed and thus is permanently inaccessible.

Disclosed herein is a system that solves the aforementioned technical problem and supports provisioning of keys to application enclaves (AEs), where the provisioned keys can be used to decrypt data regardless of the CPU that executes an AE. In an example implementation, a key derivation provider provides a key derivation enclave (KDE), which is an enclave that provides keys to authorized AEs. The keys can be used to decrypt data regardless of the CPU upon which a particular AE is currently executing. In some implementations, the KDE provides the same key to affiliated AEs that may have the same trusted code or different trusted code sets provided by the same author. The KDE generates the same key regardless of the CPU on which it is executing. In some implementations, the KDE and the AEs use attestations to ensure that they are communicating with enclaves that include code that is trusted.

In some implementations, a multi-platform key recovery system includes a key derivation provider (KDP) that provides a key to trusted code of an enclave. The key may be a symmetric key or a public/private keypair. The key derivation provider provides the same key to the trusted code irrespective of the platform (e.g., computer or processor) that executes the trusted code. In addition, the key derivation provider provides the same key to affiliated trusted code. Affiliated trusted code is trusted code that provides the same (or otherwise compatible) evidence of the trusted code (AE). The evidence (also referred to as constraint) may include one or more of a hash of the trusted code (a measurement), identification of the author of the trusted code (e.g., a hash of a public key of the author), attributes of the trusted code (e.g., product identifier of the trusted code), and so on. The evidence may be considered the same, for example, if the hash of the trusted code is the same or if the author and product identifier are the same. The evidence may be included in a report generated by a TEE of the platform on which the trusted code executes.

In some implementations, a trusted execution environment generates a master key. Multiple instances of the KDP trusted code may execute simultaneously on different platforms. Each instance of the KDP trusted code generates a master key that is compatible with the master key generated by the other instances (e.g., the same master key). The master keys are compatible in the sense that a key based on the master key that is generated by one instance can be used to decrypt data that is encrypted using a key based on the master key that is generated by another instance.

In some implementations, when an AE requests a key from a KDP, the request can include an attestation that includes a quote and the evidence of its trusted code. Upon receiving a request, the KDP validates the quote and determines whether the AE is authorized to access the services of the KDP by comparing the evidence included in the request to the evidence of authorized AEs. The KDP maintains a store of the evidence of authorized AEs. The evidence may be hardcoded in the AE, received from a server that provisions the KDP, received from a client of the AE, and so on. If authorized, the KDP generates a key based on its master key and the evidence provided by the AE. Because the key is based on the evidence of the AE, the key is compatible with the key provided to affiliated AEs. Also, because the master key is compatible with the master keys generated by the KDP executing on other platforms, the key is compatible with the key provided by KDPs executing on different platforms. The key may be generated using a key derivation function that is based on a hash-based message authentication code, such as the IEEE RFC 5869 entitled "HMAC-based Extract-and-Expand Key Derivation Function (HKDF)," which is hereby incorporated by reference. For example, the key may be generated using an HKDF and passing key specification parameters to the function.

After generating the key, the KDP then responds to the request by sending to the AE the key and an attestation of the KDP. Upon receiving the response, the AE validates the attestation of the KDP. If valid, the AE can use the key to encrypt data that can be decrypted by affiliated AEs and decrypt data the was encrypted by affiliated AEs. All communications between AEs and the KDPs can be encrypted using, for example, a Diffie-Hellman key exchange.

In some implementations, an AE stores key data that includes the key and the attestation of the KDP in encrypted form externally to the AE by providing the key data to the host of the platform. When the AE is next initialized, it can retrieve and decrypt the key data, validate the attestation of the KDP, and if valid, use the key for encryption and decryption. The storing and retrieving of the key data avoids having to request the key from the KDP. The AE, however, may not be able to load or decrypt the key data. For example, the host may not provide the key data, or the key data may be encrypted using a platform-specific key when the AE was executing on another platform. Even if loaded and decrypted, the attestation of the KDP may not be valid, for example, if a different version of the KDP provided the attestation of the KDP. The key data can be stored using a "mail-to-self" feature provided by the host. The AE can generate and send to the host a mail-to-self that includes the key data that is encrypted using a platform-specific key. When the AE is restarted, it then requests the host to provide the mail-to-self so the key data can be retrieved.

Furthermore, the systems, methods, and computer-readable media disclosed herein solve the technical problem of persisting data in a secure enclave that does not, by default, have access to the file system on an untrusted host. The technical problem is solved, for example, by implementing secure, encrypted storage solutions, such as a persistent file system and/or a persistent key-value map. In some implementations, the technical problem of migrating persistent data across CPUs and/or enclave versions is solved by implementing a dynamic key management solution using a KDP.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Key Distribution Environment for a Secure Enclave

FIG. 1A is a block diagram that illustrates a scenario in which clients and AEs interact with a KDE. A KDE is an enclave with trusted code of a KDP. As shown according to an implementation, the diagram includes KDE 101, clients 111-115, and servers 121-124 that communicate via communications channel 130. The servers each host one or more AEs. For example, server 122 hosts three instances of AE1 and one instance of AE3. Each client is a client of one or more AEs. For example, client 112 is a client of AE2 and AE3.

In some implementations, a dedicated shared key is provided by a single KDE to different application enclaves that can reside on the same host (e.g., AE2, AE3) and/or on different hosts (e.g., AE1, AE2 and AE3). In such implementations, a particular application can include more than one enclave-based services, which may share a master key provided by the KDE 101. In some implementations, the KDE 101 provider service is offered in a platform-as-a-service (PaaS) mode that includes a plurality of KDEs 101. In such implementations, multiple servers, each hosting one or more AEs, can each route requests for keys to their dedicated particular instances of KDEs 101.

In some implementations, the KDE 101 generates master keys. In some implementations, for example, where tenant entities can provide their own keys or use a third-party key provider, the KDE 101 initiates an electronic message to an external master key provider (KDP, not shown) that in in response sources the master key. A variety of suitable of master key providers are contemplated, such as Azure Cloud Sealing Service, a Hardware Security Module (HSM), a peer-to-peer key exchange service, and/or AWS KMS. The generated or derived keys can be symmetric (e.g., AES-256) or asymmetric (e.g., Curve-25519).

In some implementations, the KDE 101 derives master key materials (cryptographic secrets that compose a particular key) based on a specification for the key being requested. A master key request can originate at an AE and be routed to a KDE via the host associated with the particular AE. A specification can be included in such an electronic request received by the KDE 101 from an AE via an API, such as REST API. The specification can include any suitable fields, such as a key identifier, a key name, a type of master key provider used to source the master key, a URL of the master key provider, one or more constraints to validate the master key provider, a key access policy, and/or the like. In some implementations, the uniqueness of a combination of fields within a specification determines the degree of uniqueness of a particular key relative to other keys. In some implementations, the key identifier is a hash of the key specification fields. For example, each non-null specification field can be hashed using a suitable hashing algorithm, such as SHA-256, and the hash values can be concatenated to produce the key. The key name is used during key derivations and can include a descriptor of the key and its constraints. Master key constraints can be applied to the KDE 101 to ensure it is providing a valid key. Policy constraints refer to constraints that need to be met in order for the KDE 101 to allow a private key and/or key material to be sent to a particular recipient.

Figure 1B:
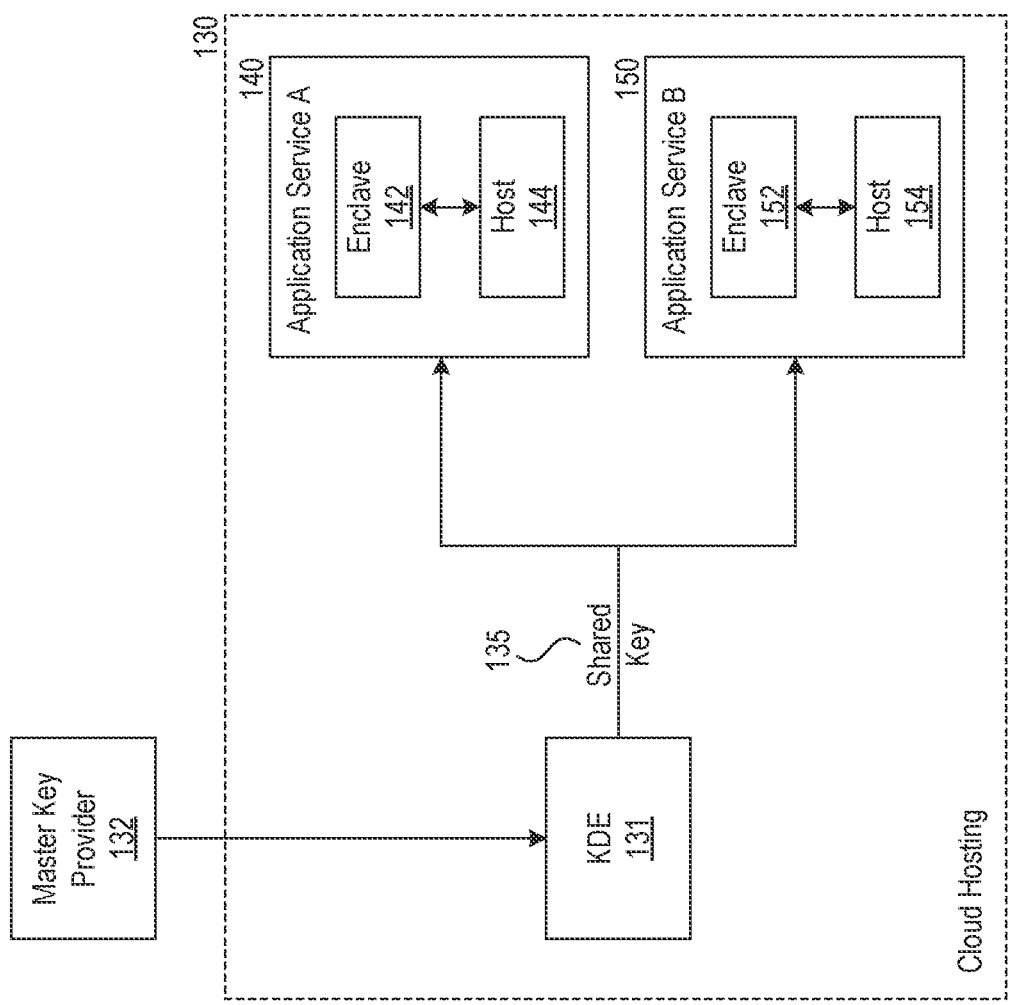
FIG. 1B is a block diagram that illustrates a scenario in which a KDE provides a shared key, according to some implementations.

FIG. 1B is a block diagram that illustrates a scenario in which a KDE 131 provides a shared key, according to some implementations. As shown, the KDE 131 is communicatively coupled to a master key provider 132, such as Azure Cloud Sealing Service, a Hardware Security Module (HSM), a peer-to-peer key exchange service, and/or AWS KMS. The master key provider 132 can generate and provide a master key and/or master key materials to the KDE 131. Once the KDE 131 has access to a master key, it can generate one or more shared keys 135 for use by the AEs (142, 152) of different application services (140, 150). The application services (140, 150) are also shown to include respective hosts (144, 154). The KDE 131 can generate multiple electronic transmissions and send copies of the shared key 135 to the application services (140, 150) for use by the respective AEs (142, 152). The copies of the shared key 135 can be routed to the respective AEs (142, 152) via the hosts (144, 154).

Figure 1C:
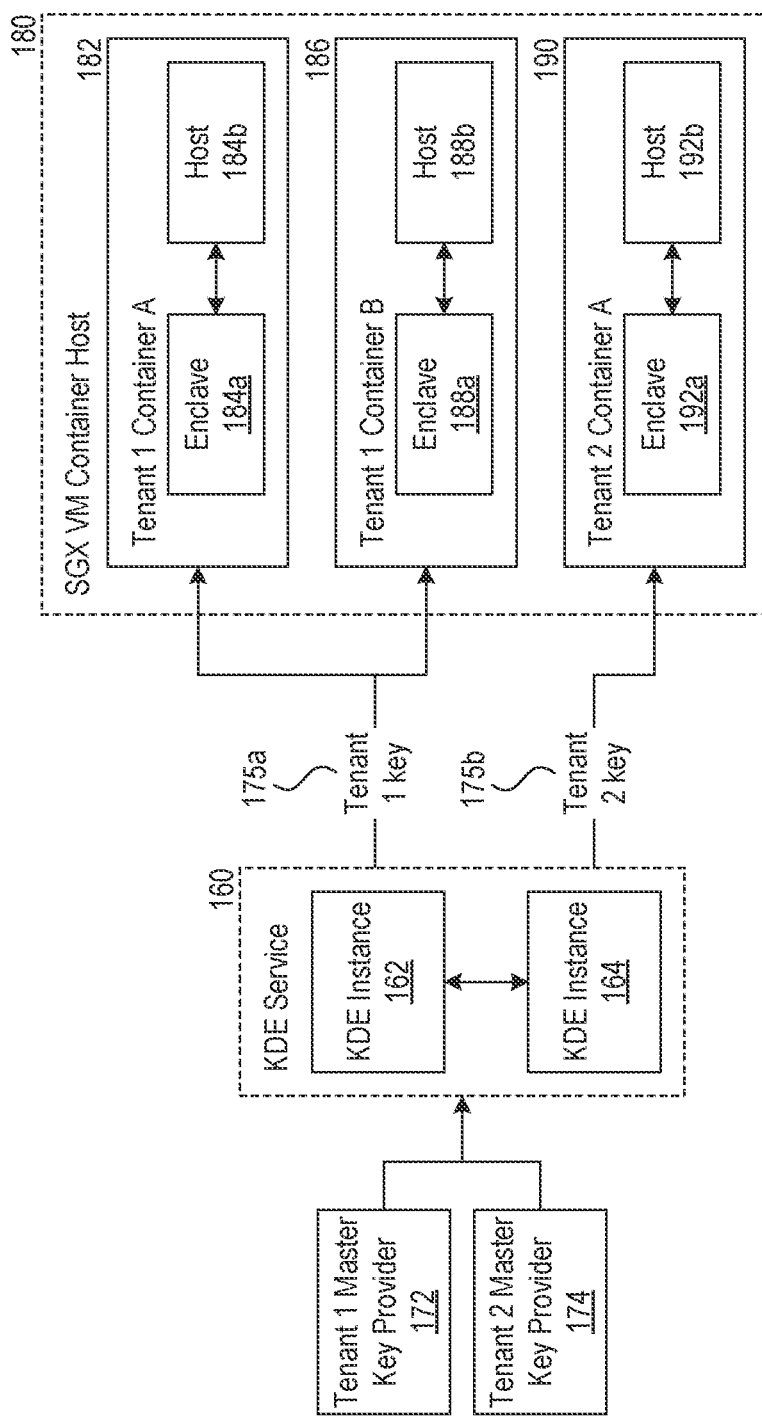
FIG. 1C is a block diagram that illustrates a scenario in which a KDE service provides keys in a multi-tenant environment, according to some implementations.

FIG. 1C is a block diagram that illustrates a scenario in which a KDE service 160 provides keys in a multi-tenant PaaS environment, according to some implementations. As shown, the KDE service 160 forms part of a hosted platform that supports multiple tenants. A tenant can be thought of as an entity that deploys, manages, and/or configures a particular application that runs in an AE (184a, 188a, 192a). The AEs (184a, 188a, 192a) are hosted within containers (182, 186, 190) managed by a container host 180. Containers (182, 186, 190) virtualize operating systems and manage computing resources for the respective hosts (184b, 188b, 192b), which run AEs (184a, 188a, 192a). In cloud computing environments, containers (182, 186, 190) are portable and can, at various times, each use different physical resources (CPU, memory, etc.) without compromising the ability to recover the keys (175a, 175b).

As shown, each tenant can have its own master key provider (172, 174). The KDE service is shown to include a plurality of KDE instances (162, 164), where each KDE instance (162, 164) can be coupled to one or more tenant containers (182, 186, 190). To cryptographically separate the two tenants, the keys (175a, 175b) can be generated using different master keys provided according to a configuration specific to each tenant. For example, a particular master key provider 172 can generate and provide a master key and/or master key materials to the first KDE instance 162. Once the KDE instance 162 has access to a master key, it can generate one or more shared keys 175a for use by the AEs (184a, 188a) of containers (182, 186) associated with the first KDE instance 162.

Key Distribution Message Flow

Figure 2A:
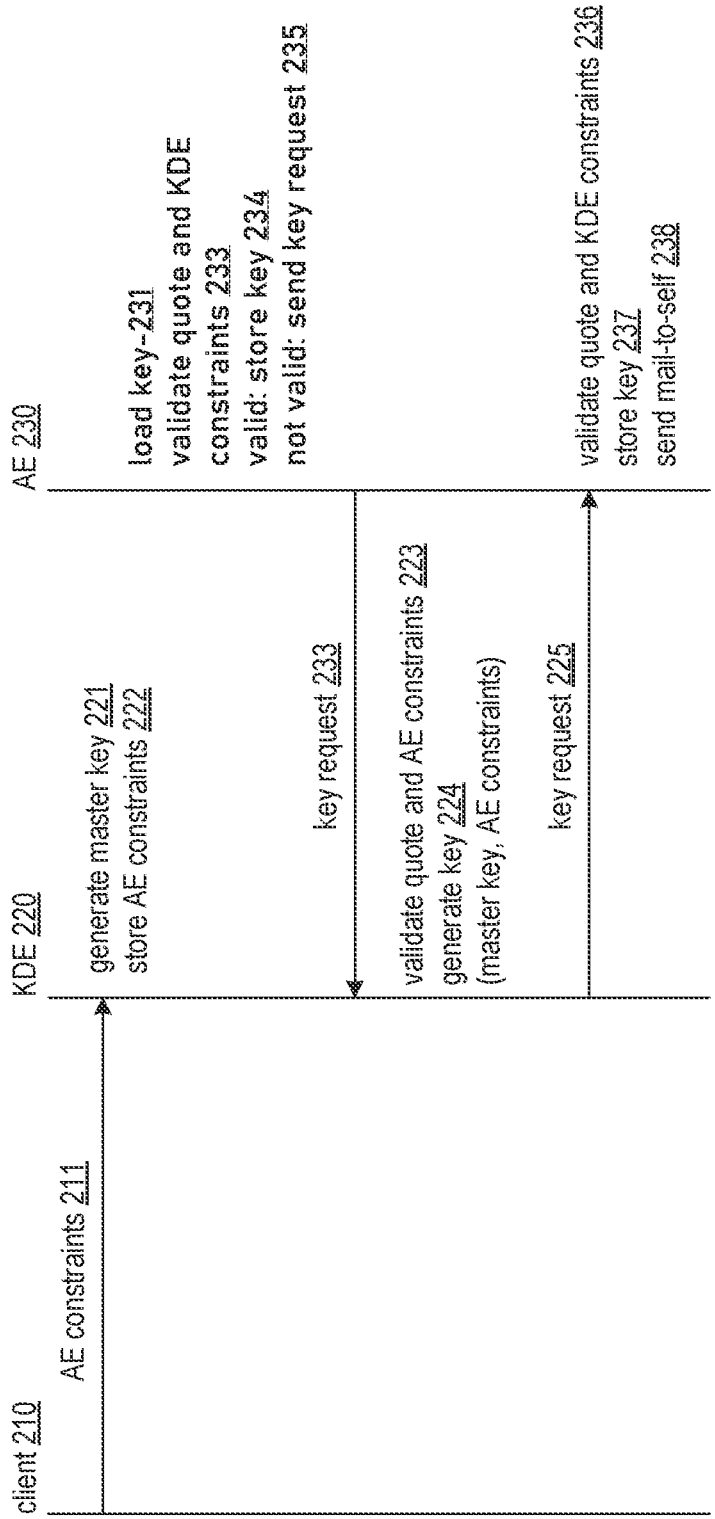
FIG. 2A is a communications diagram that illustrates communication between a client, a KDE, and an AE, according to some implementations.

FIG. 2A is a communications diagram that illustrates communication between a client, a KDE, and an AE. The KDE 220 initially generates 211 a master key. The client 210 provisions the AE 230 to the KDE by sending 211 the AE constraints to the KDE. The KDE stores 222 the AE constraints as authorized evidence of an authorized AE.

When the AE is initialized, the AE attempts to load 231 a key that has been previously sealed using an encryption key that is unique to the CPU. If a key cannot be unsealed, then the AE sends a key request to a KDE and receives a key generated or provided by the KDE. The AE then validates 233 the quote and KDE constraints of the attestation. If valid, the AE stores 234 the key and proceeds to encrypt and decrypt data using the key. If the mail-to-self cannot be loaded, decrypted, or the quote or the KDE constraints are not valid, the AE sends 235 a key request to the KDE that includes an AE attestation.

Upon receiving the key request, the KDE validates 223 the quote and the AE constraints of the attestation. The KDE validates the AE constraints by checking that they match authorized constraints received as part of the key request, originating from the client. If valid, the KDE generates 224 a key (e.g., public/private keypair) unique to the AE. The key is based on the master key and derived, using HKDF or another suitable derivation algorithm, from the key specifications, including the AE constraints. The KDE then sends 225 a key response to the AE that includes the key and a KDE attestation.

Upon receiving the response, the AE validates 236 the quote and KDE constraints of the attestation. If valid, the AE stores 237 the key and proceeds to encrypt and decrypt data using the key. The AE can also store a copy of the key locally on the system by sealing it using a key that is unique to the CPU and storing it encrypted outside the enclave.

Key Distribution System State Management

Figure 2B:
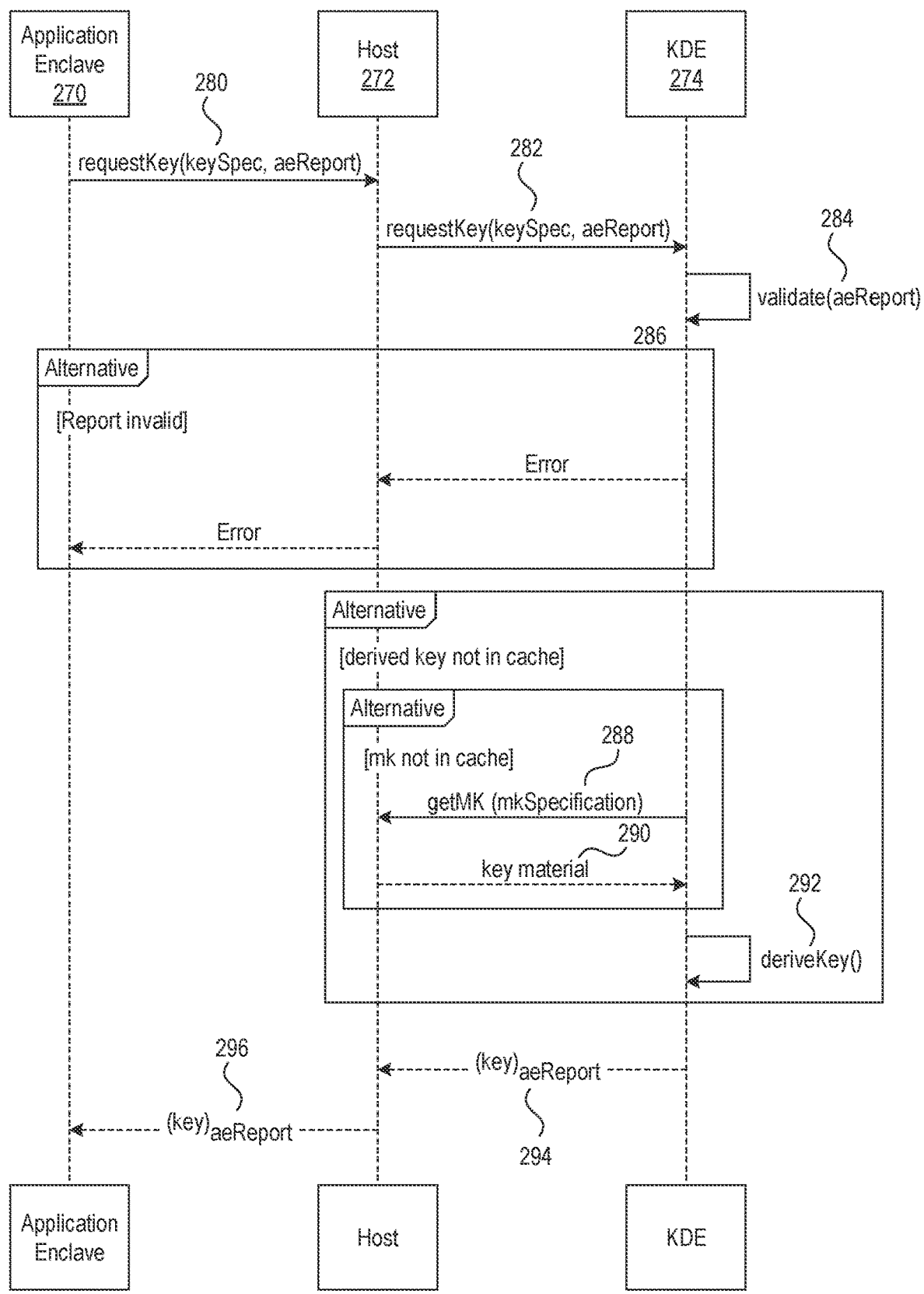
FIG. 2B is a communications diagram that illustrates optimized KDE state in communication between an AE, a host, and a KDE, according to some implementations.

FIG. 2B is a communications diagram that illustrates optimized KDE state in communication between an AE 270, a host 272, and a KDE 274, according to some implementations. Generally, to facilitate data migration, the KDE 274 provides a stateless service where neither a history of changes regarding a particular key nor a snapshot of the key in its various prior states are maintained. Master keys are derived based on the parameters provided in each particular key request (280, 282). The KDE 274 retrieves or generates the keys after validating the evidence provided by the AE 270 at 284. In some implementations, in order to optimize key retrieval and provisioning time, the KDE 274 can maintain a state-like record by, for example, caching the keys and/or key materials and checking the cache prior to responding to key provisioning requests. If a key is found in cache, then the KDE returns the key (294, 296). If a key not in cache but the key specification is found in cache, then the KDE 274 derives the key 292 based on the specification and then returns the key (294, 296). If neither the key nor the specification are found in the cache, then the KDE 274 also obtains the specification 288 prior to deriving and returning the key.

The cache for a particular key can be managed at key level (specified for each key) and/or KDE 274 level and can include a master key expiry setting and/or a derived key expiry setting. The master key expiry setting specifies the time in seconds after which a cached master key should be purged from the KDE 274 in-memory cache. This timer is reset inside the KDE 274 each time key material is accessed. The derived key expiry setting specifies the time in seconds after which a cached derived key should be purged from the KDE 274 in-memory cache. This timer is reset inside the KDE 274 each time the derived key material is accessed.

Operations of a Key Distribution System

Figure 3:
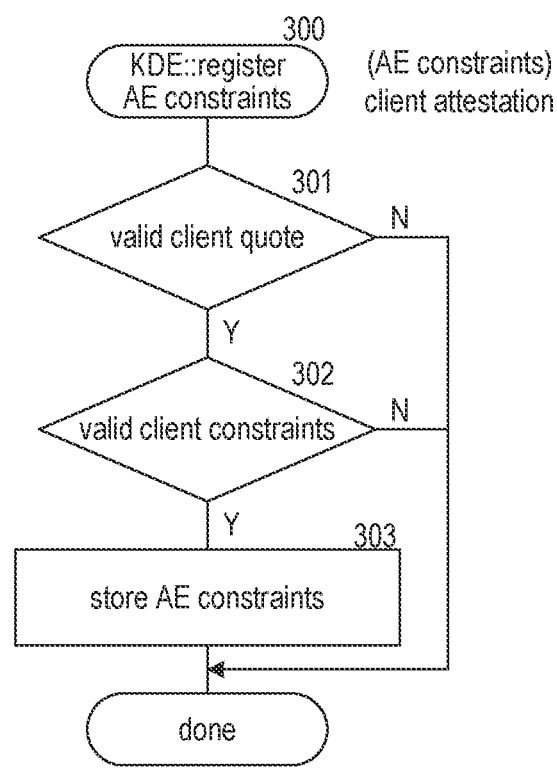
FIG. 3 is a flow diagram that illustrates the processing of a register AE constraints component of the KDE, according to some implementations.

FIG. 3 is a flow diagram that illustrates the processing of a register AE constraints component of the KDE in some implementations. The register AE constraints component 300 is invoked passing an indication of AE constraints and attestation that are received from a client. In decision block 301, the component determines whether the quote is valid. If valid, the component continues at block 302, else the component completes. In decision block 302, the component validates the client constraints. If valid, the component continues at block 303, else the component completes. In block 303, the component stores the AE constraints and then completes. The validation of the attestation may not be needed, if KDE supports receiving AE constraints from any client.

Figure 4:
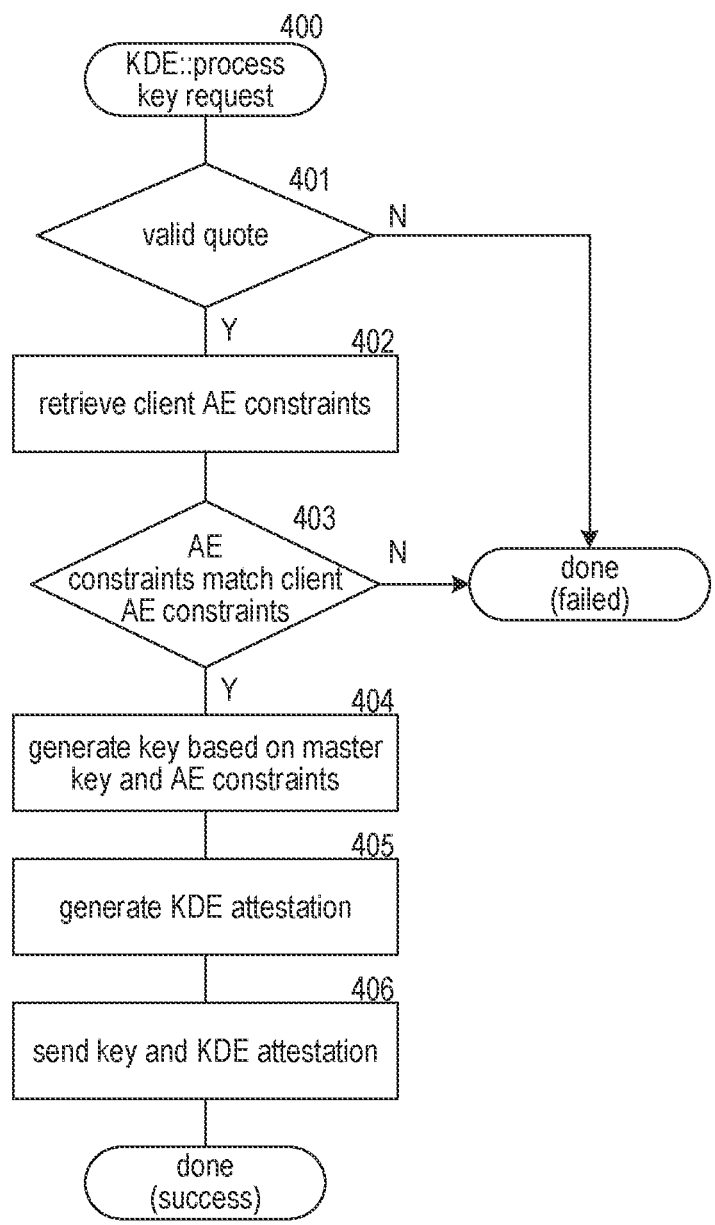
FIG. 4 is a flow diagram that illustrates the processing of a process key request component of the KDE, according to some implementations.

FIG. 4 is a flow diagram that illustrates the processing of a process key request component of the KDE in some implementations. The process key request component 400 processes the key request received from an AE. In decision block 401, if the quote of the attestation of the key request is valid, then the component continues at block 402, else the component completes indicating that the request cannot be processed. In block 402, the component retrieves the authorized AE constraints that may been received from multiple clients. In decision block 403, if the AE constraint of the request matches authorized AE constraints, then the component continues at block 404, else the component completes indicating that the request cannot be processed. In block 404, the component generates a key based on the master key (previously generated for the KDE) and the AE constraints, key name, master key configuration, and/or other parameters provided in the key request. In block 405, the component generates a KDE attestation (or retrieve one previously generated). In block 406, the component sends a key response to the AE that includes the key and the KDE attestation and then completes indicating success.

Figure 5:
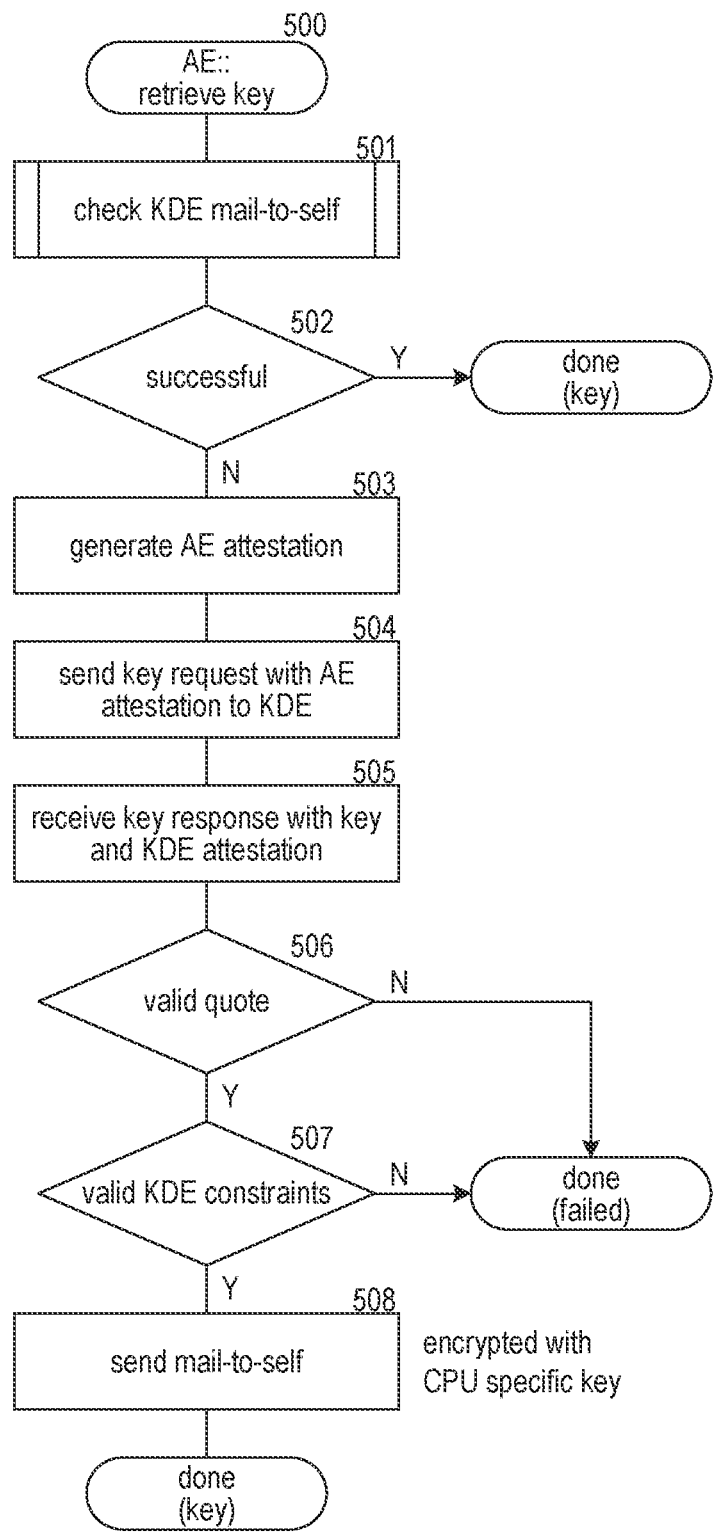
FIG. 5 is a flow diagram that illustrates the processing of a retrieve key component of an AE, according to some implementations.

FIG. 5 is a flow diagram that illustrates the processing of a retrieve key component of an AE in some implementations. The retrieve key component 500 is invoked when the AE is initialized and retrieves a key generated by the KDE. In block 502, the component invokes a check KDE mail-to-self component to determine whether the key is available in the mail-to-self previously sent by the AE. In decision block 502, if the key was successfully retrieved, then the component completes providing the key, else the component continues at block 503. In block 503, the component generates an AE attestation that includes the AE constraints. In block 504, the component sends a key request with the AE attestation to the KDE. In block 505, the component receives a key response with the key and a KDE attestation. In decision block 506, if the quote of the KDE attestation is valid, then the component continues at block 507, else the component completes indicating that the key cannot be retrieved. In decision block 507, the component validates the KDE constraints of the KDE attestation against hardcoded constraints in the data of the AE. If valid, the component continues at block 508, else the component completes indicating that the key cannot be retrieved. In block 508, the component sends a mail-to-self that includes the key and the KDE attestation that is encrypted with a CPU unique key. The component then completes returning the key.

Figure 6:
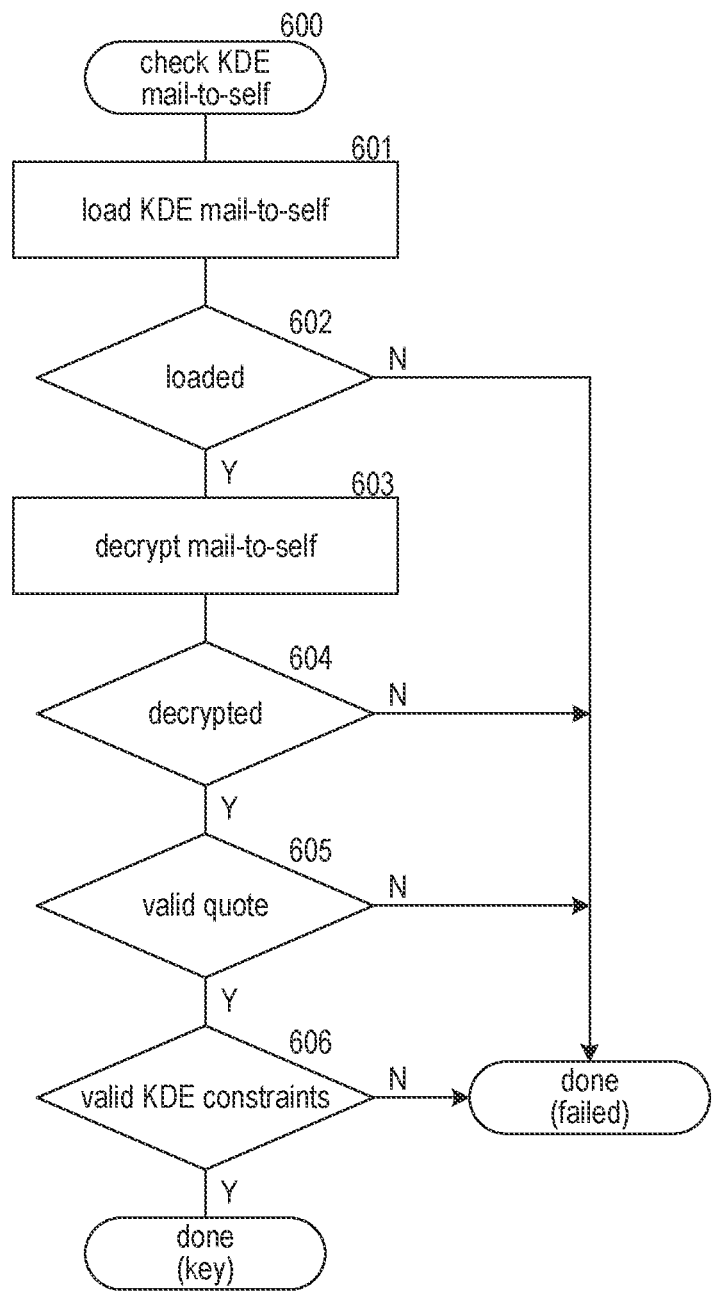
FIG. 6 is a flow diagram that illustrates the processing of a check KDE mail-to-self component, according to some implementations.

FIG. 6 is a flow diagram that illustrates the processing of a check KDE mail-to-self component in some implementations. The KDE mail-to-self component 600 determines whether a key can be retrieved from a mail-to-self that the AE previously sent from the CPU upon which it is currently executing. In block 601, the component attempts to load the KDE mail-to-self. In decision block 603, if loaded, then the component continues at block 603, else the component completes indicating failure. In block 603, the component decrypts the mail-to-self. In decision block 604, if the mail-to-self was successfully decrypted, then the component continues at block 605, else the component completes indicating failure. In decision block 605, the component validates the quote of the KDE attestation that was included in the mail-to-self. If valid, the component continues at block 606, else the component completes indicating failure. In decision block 606, the component validates the KDE constraints of the attestation in the mail-to-self. If valid, then the component completes indicating success, else the component completes indicating failure.

Figure 7A:
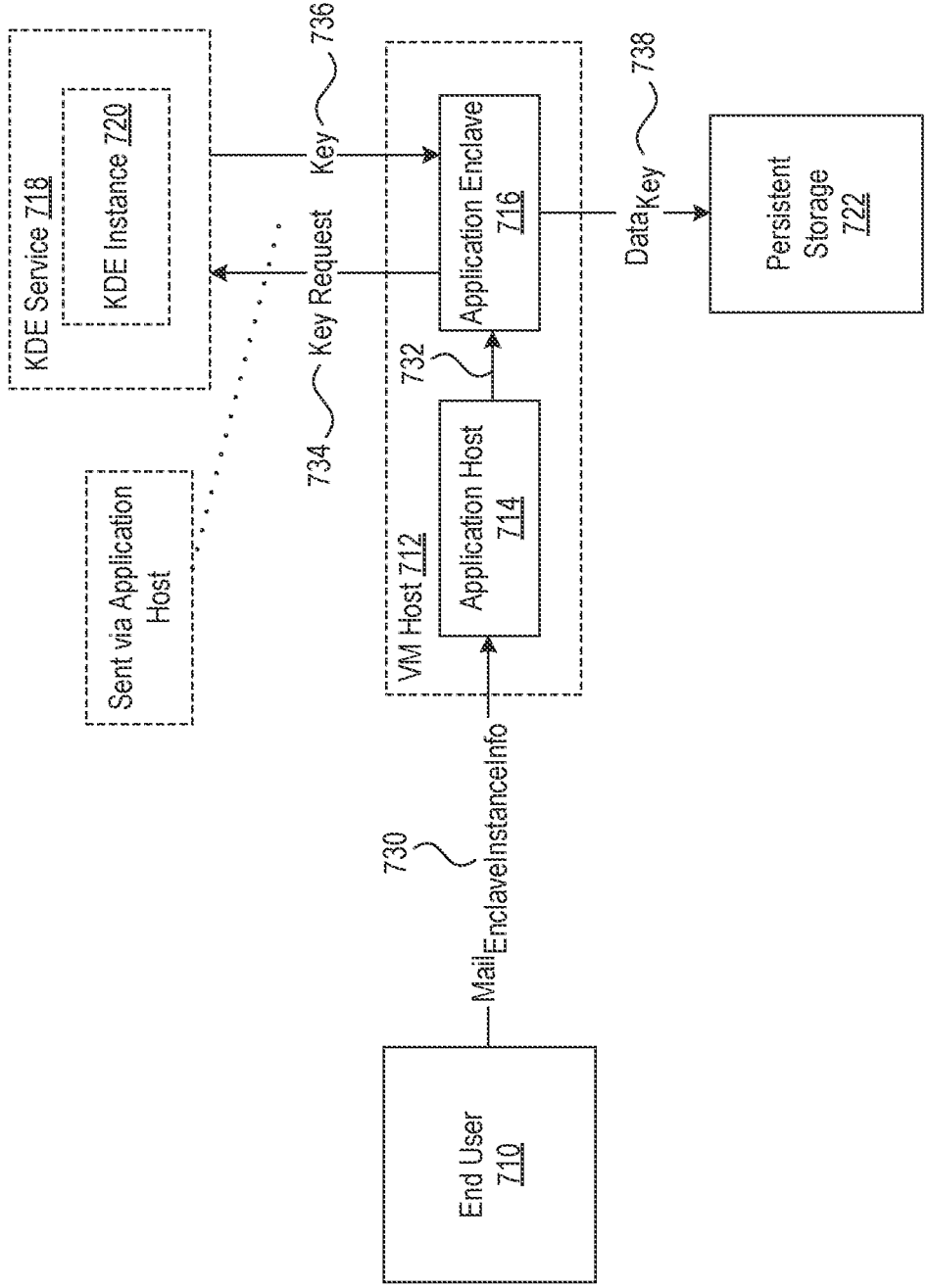
FIG. 7A is a block diagram that illustrates operations of the end user sending mail using an application enclave key after establishing trust in a KDE, according to some implementations.

Establishing Trust Between an End User, an Application Enclave, and a Key Distribution System FIG. 7A is a block diagram that illustrates operations of the end user sending mail using an AE key after establishing trust in the KDE 720, according to some implementations. The end user 710 requests reports for attesting trust in a particular application. Once trusted, the end user 710 sends mail (730, 732) to the AE 716 via the host 714 using the key provided as part of the AE 716 attestation. The key was previously generated (734, 736) by the KDE service 718. The AE 716 encrypts 738 application data to persist in persistent storage 722.

Figure 7B:
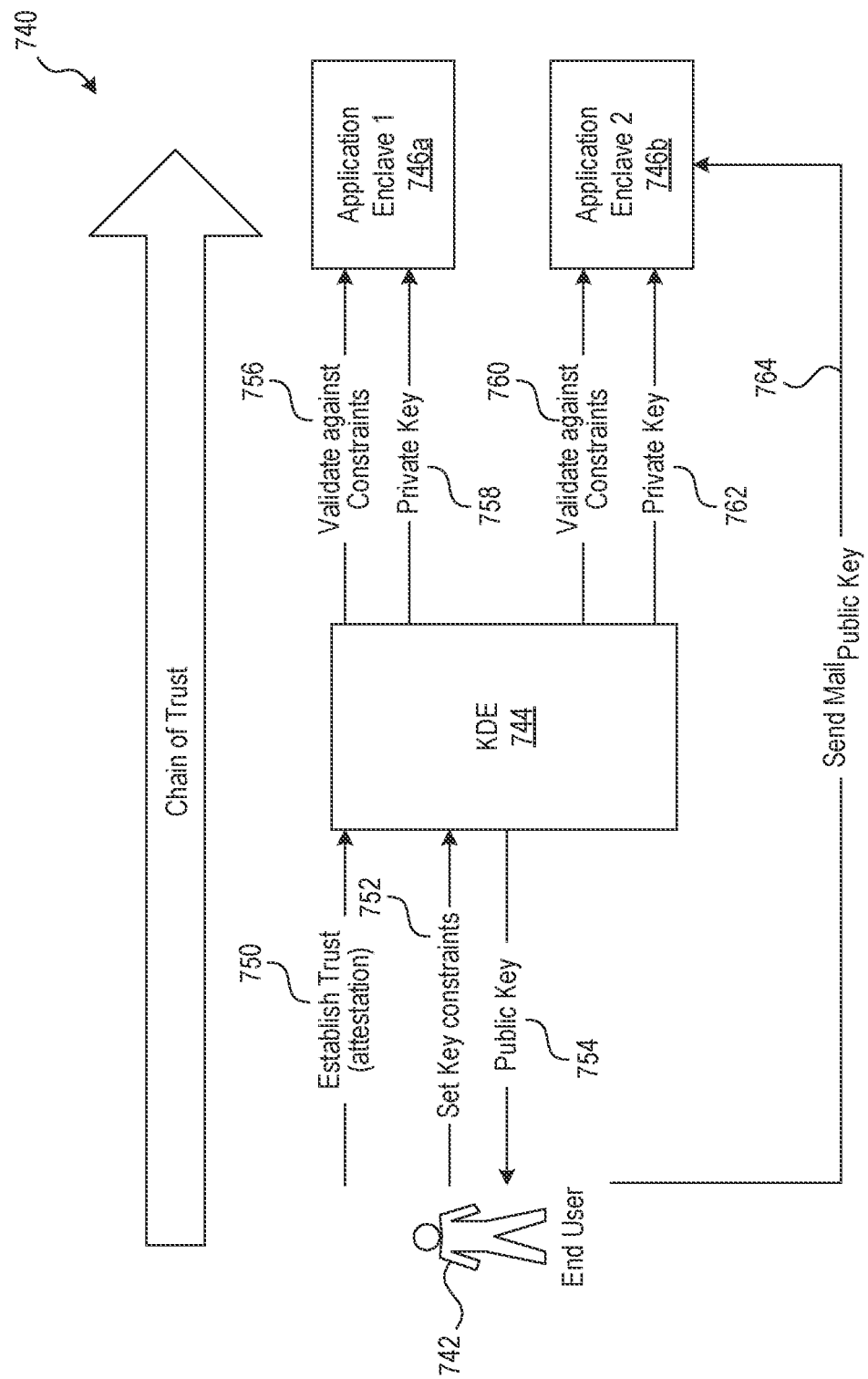
FIG. 7B is a block diagram that illustrates a chain of trust between a client, a KDE, and AEs, according to some implementations.

FIG. 7B is a block diagram that illustrates a chain of trust 740 between a client (e.g., a device associated with end user 742), a KDE 744, and AEs (746a, 746b), according to some implementations. The chain of trust 740 allows to ensure that the AEs (746a, 746b) use valid keys from the KDE 744 and that KDE 744 is not compromised. As shown, the end user 742 can establish 750 trust with KDE 744 via attestation, by obtaining the KDE 744 report and attesting to its validity. The KDE 744 is then trusted to provide application enclaves (746a, 746b) with keys (758, 762) only if the AEs are validated against constraints (756, 760) provided by the end user 742 at 752. Constraints, also referred to as evidence, can include one or more of a hash of the trusted code (a measurement), identification of the author of the trusted code (e.g., a hash of a public key of the author), attributes of the trusted code (e.g., product identifier of the trusted code), and so on. To validate an AE against constraints, the KDE 744 can review the constraints provided by the client at 752.

Once the end user 742 gains trust in the KDE 744 via attestation and because the end user 742 is assured that KDE 744 will provide keys according to user-provided constraints 752, the end user 742 can leverage that trust by encrypting mail messages using the KDE 744 public key generated by the KDE 744 and provided to the end user 742 at 754. The KDE 744 also provides private keys (758, 762) to the AEs (746a, 746b). The end user 742 can encrypt mail messages sent to the AE (746a, 746b) with the public key 754, and the AEs (746a, 746b) will only be able to decrypt these messages with private keys (758, 762) provided by the KDE 744.

Persistence in a Secure Enclave—Encrypted File System

Figure 8A:
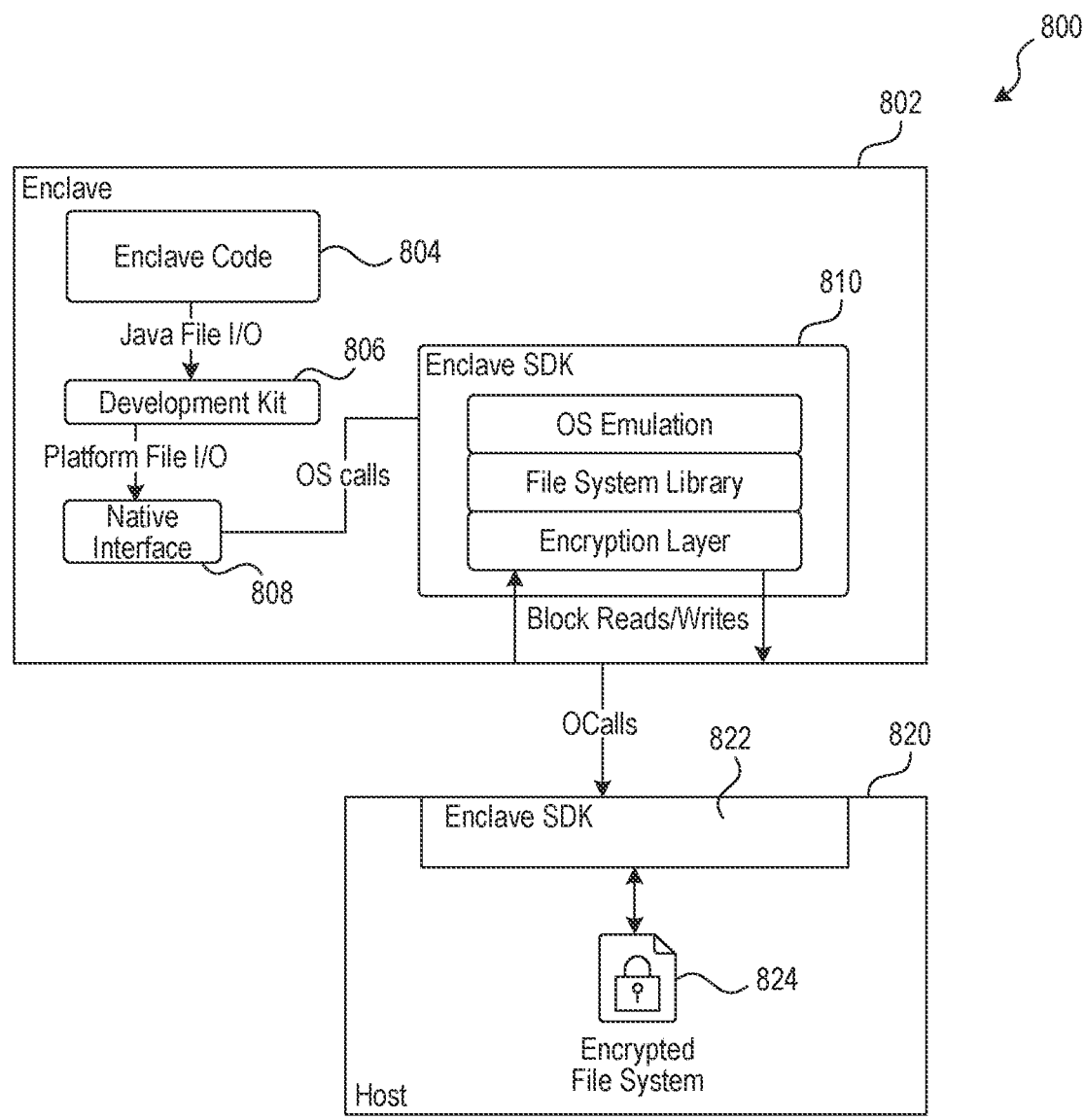
FIG. 8A is a block diagram that illustrates a persistent file system in a secure enclave, according to some implementations.

FIG. 8A is a block diagram that illustrates a persistent encrypted file system 800 for a secure enclave 802, according to some implementations. As a general matter, a TEE (enclave 802) implemented as trusted code (e.g., 804, 806, 808, 810) within protected memory does not have access to a physical disk to persist data on the host 820. This presents a technical problem, as the host 820 is not trusted and should not see the data. Furthermore, the host 820 may not faithfully store data correctly and/or it may try to deduce information if it can observe access patterns when the enclave 802 reads or writes to the host 820. To solve these technical problems, enclave 802 can implement a persistent encrypted file system 800. Alternatively or additionally to the persistent encrypted file system 800, the enclave 802 can implement an in-memory file system, which does not persist across restarts of the enclave 802. The in-memory file system allows libraries and applications to have a scratch space for preparing data before encrypting the data for storage.

In some implementations, the persistent encrypted file system 800 is represented on the host 820 as a single physical file, such as a persistent encrypted file 824. The persistent encrypted file 824 can include a plurality of in-enclave directories, which can be referenced by the trusted code (804, 806, 808, 810). The persistent encrypted file 824 can be encrypted using a suitable encryption mechanism. In some implementations, the persistent encrypted file 824 is encrypted using a CPU-specific sealing key derived from MRSIGNER. In some implementations, to allow for transferability between CPUs, the persistent encrypted file 824 is encrypted using a key provided by a KDE, as described, for example, in reference to FIG. 8B.

As shown, the data persistence ecosystem can generally include a secure enclave 802 embodied as trusted code (804, 806, 808, 810) executed on the computing resources provided by the host 820. The enclave 802 communicates with the host 820 via a library 822. The trusted code libraries (804, 806, 808, 810) enable the enclave 802 to perform file system operations. Accordingly, rather than delegating the management of files and directories to the host 820 and only encrypting the contents of each file, this implementation creates an in-enclave (e.g., virtual) file system and converts in-enclave file operations into the equivalent of sector-based reads and writes. For example, the trusted code libraries (804, 806, 808, 810) can implement an indexing structure that uses an index table to identify chains of in-enclave data storage areas associated with an in-enclave file, where each entry contains the number of the next cluster in the in-enclave file or a marker indicating the end of the in-enclave file. The in-enclave root directory of the in-enclave file system can contain the number of the first cluster of each file in the in-enclave directory. The trusted code libraries (804, 806, 808, 810) can then traverse the in-enclave directory structure, looking up the cluster number of each successive part of the virtual file as a cluster chain until the end of the in-enclave file is reached. In-enclave sub-directories can be implemented as special in-enclave files containing the in-enclave directory entries relating to the respective in-enclave files associated with the sub-directories.

The trusted code libraries (804, 806, 808, 810) can include executables to perform file operations. These executables can be written in a suitable programming language, such as but not limited to Java, to interact with the in-enclave filesystem represented on the host 820 as a persistent encrypted file 824. For instance, in some implementations a development kit 806 (e.g., Java Development Kit (JDK)) converts calls to the host operating system via an interface 808 (e.g., a Java Native Interface (JDN)). The trusted code library 810 intercepts these calls by providing an operating system emulation engine (e.g., a portable operating system interface (POSIX) emulation engine, a network file system (NFS) emulation engine, or similar). The operating system emulation engine implements the calls by passing them to a FAT file system library engine. Example operating system emulation engine operations can include, for example, operations to mount/unmount the file system, open/close a file, write/read from a file, create/move/remove directories, and so forth. The file system library engine converts the file operations into sector reads and writes inside the enclave 802. The payload for each read and write operation can include one or more data values indicative of a particular sector of a segmented in-enclave file.

As noted above, in an implementation where the host 820 is untrusted, the enclave 802 cannot persist sector-level operations as the enclave 802 has no access to a physical disk of the host 820. Accordingly, the enclave 802 delegates the read and write operations to the host 820. When delegating to the host 820, the enclave 802 aims to protect the confidentiality and integrity of the sector data. To do this, the enclave 802 encrypts each sector using, for example, AES-GCM or another suitable scheme, with a key derived from KDE or with the root sealing key of the CPU.

In some implementations, for example, the enclave 802, after initialization, obtains a master key from a KDE. The enclave 802 stores the obtained master key in cache memory of the enclave 802. The enclave 802 receives a data management call (e.g., a request to read data, a request to write data, a request to generate or update data, etc.) from the application 804. In response, the enclave 802 utilizes the in-memory file system to perform the requested operations. When committing the operations to a disk, the enclave 802 performs operations 806, 808, and 810 to prepare the data item (e.g., in-enclave file) for saving to the persistent encrypted file 824. Prior to sending 822 the data item to the host 820, the enclave 802 encrypts the data item using the received key. Subsequently, when a read operation is requested by the application 804, the enclave 802 retrieves the data item from the encrypted file 824, retrieves and/or re-requests the key from the KDE, and decrypts the data item using the key.

The host 820 receives requests to read and write encrypted sectors via an outgoing call 822 from the enclave 802. The host maintains a single persistent encrypted file 824 to handle the requests from the enclave 802. The host 820 reads from or writes to the file at an offset based on the sector number requested by the enclave 802.

In some implementations, once the data has been encrypted prior to being written, the order of the sectors is randomized by the enclave 802 using the encryption key as a seed, which provides a level of protection against the host 820 where an observer can gather information about the operation of the enclave 802 by monitoring sector reads and writes. Without randomization, writing a large file inside the enclave 802 would result in a number of sequential sector writes on the host 820, giving the host 820 an idea of the size of the file and the amount of data being written. With randomization, the host 820 will still see the same number of sector writes from the enclave but will not be able to determine that the writes all relate to the same file. In some implementations, a further level of protection includes randomizing sector read and write operations from the enclave 802, which masks the read and write operations from the host 820.

Persistence in a Secure Enclave Using KDE-Provided Keys

Figure 8B:
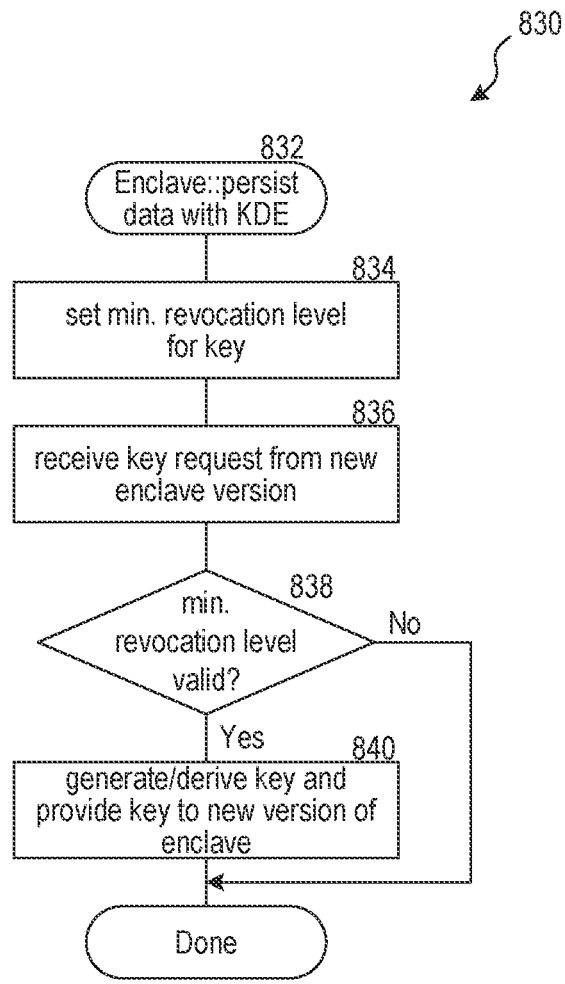
FIG. 8B is a flow diagram that illustrates the processing of a persist data component of a secure enclave using a KDE, according to some implementations.

FIG. 8B is a flow diagram that illustrates the processing of a persist data component 832 of a secure enclave using a KDE, according to some implementations. As described in reference to FIG. 8A, the persist data component 832 allows a secure enclave share persistent data between machines. For instance, if a particular AE or KDE uses dynamically-allocated resources (as in cloud computing environments), the AE or KDE can continue to access persistent data. Furthermore, as shown in FIG. 8B, the persist data component 832 allows for migration of data between AE or KDE versions. The operations described herein solve the technical problem of finding balance between restricting the use of keys to particular versions of enclaves, which ensures the smallest attack surface, and allowing for data portability from legacy AEs or KDEs to their newer versions.

A legacy version of an AE or KDE can use an encryption key generated and provided by a particular KDE. As part of requesting the key, the legacy AE or KDE provides 834 a specification to the KDE, which outlines various parameters for generating and/or deriving the key and includes a first minimum revocation level value. When a new version of an enclave requests 836 the key from the KDE, the new specification includes a second minimum revocation level value. The minimum revocation level value specifies that only the current version of an enclave and its subsequent versions can access the data. Accordingly, the new version is able to access the legacy version's data by providing a key specification with the first revocation level because the KDE is able to validate 838 the provided request against the first revocation level previously provided by the legacy version and generates or derives 840 the requested key. However, the legacy version is not able to access the new version's data.

Persistence in a Secure Enclave—Persistent Map

Figure 9A:
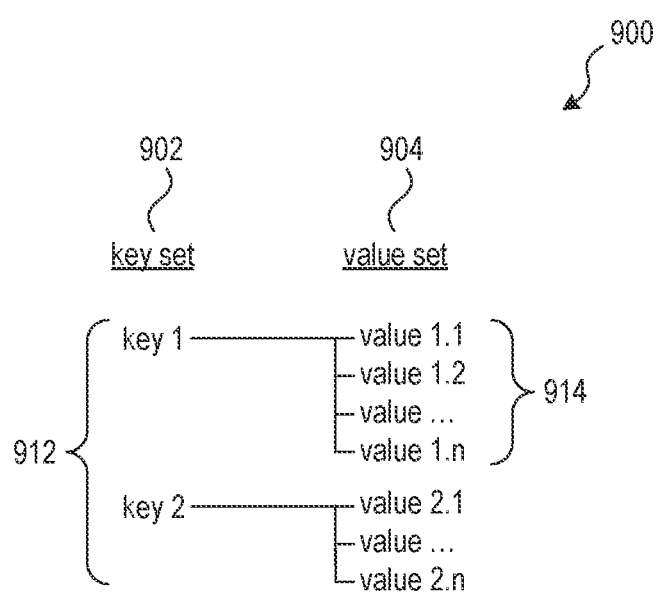
FIG. 9A is a block diagram illustrating a persistent map in a secure enclave, according to some implementations.

FIG. 9A is a block diagram illustrating a persistent map 900 in a secure enclave, according to some implementations. A persistent map 900 can persist across enclave restarts and therefore can provide a way to reference previously written data. In an implementation, an AE or KDE can persist a persistent map 900 across restarts of the AE or KDE by generating and/or updating the persistent map 900 using in-memory cache and then causing the host to save a copy of the persistent map 900 for later retrieval by the AE or KDE. In some implementations, the persistent map 900 is encrypted using a CPU-specific sealing key derived from MRSIGNER. In some implementations, to allow for transferability between CPUs, the persistent map 900 is encrypted using an encryption key provided by a KDE.

As shown, a persistent map 900 can be a key-value store that includes a key set 902 and a value set 904. One of skill will appreciate that a particular key 912 in the key set 902 does not necessarily refer to the encryption key used to encrypt the persistent map 900. Rather, the key 912 uniquely identifies one or more particular corresponding values 914 in the value set 904 that corresponds to the key 912. Furthermore, one of skill will appreciate that a particular persistent map 900 can include only one key 912 in the key set 902, and a particular key 912 in the key set 902 can correspond to one or more values 914 in the value set 904. According to various embodiments, the key 912 and/or value 914 can be set to any suitable numerical, alphanumeric, or combination value. For example, a key 912 can be a string value encoded (converted to a unique binary value) using a suitable encoding schema, such as UTF-8, ASCII, and/or the like. In some implementations, in order to optimize the read/write operations, the size of each key 912 is limited to a suitable value, such as, for example, 65,535 bytes. In some implementations, the entire persistent map 900 is encrypted, thereby generating a single binary large object (blob). In some implementations, each key and/or value in the persistent map 900 are encrypted.

In some implementations, the persistent map 900 is serialized (encrypted and encoded as a blob) and committed to storage (provided to the host to save to disk) after an occurrence of a particular event is detected by the AE or KDE. For example, the AE or KDE can implement a computer-executable listener component to monitor inbound calls from the host. When an inbound call is received, decrypted and authenticated, the AE or KDE can serialize and commit the persistent map 900 to storage prior to performing operations specified in the inbound call from the host.

Preventing Rollback/Rewind Attacks using Persistent Structures

Rollback attacks, also referred to as replay attacks and rewind attacks, can compromise the integrity of stateless enclaves. Rollback attacks can involve taking a snapshot of enclave data and subsequently (e.g., after an enclave is restarted and re-initialized) providing the old snapshot to the enclave so that not all transactions (e.g., data operations that change data values) are accounted for. Furthermore, rollback attacks can include modifying data values in the snapshot taken. To solve the technical problem of minimizing the possibility of rollback attacks on persistent structures (e.g., the persistent file system and/or persistent map), systems and methods described herein can be used. The systems and methods allow clients in the client-enclave-host ecosystem to assist in preventing and/or detecting rollback attacks.

Figure 9B:
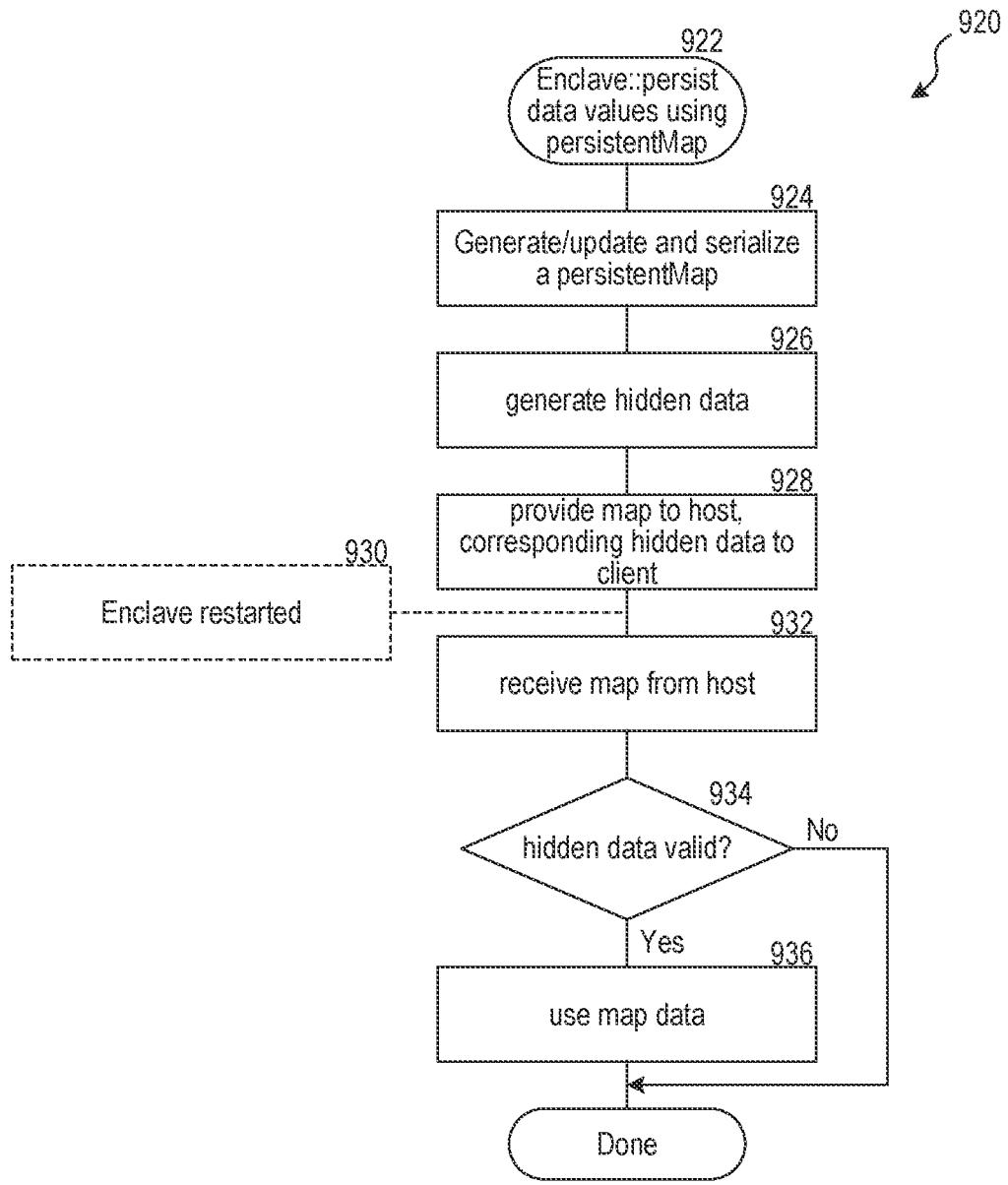
FIG. 9B is a flow diagram that illustrates the processing of a persist data component of a secure enclave using a persistent map, according to some implementations.

FIG. 9B is a flow diagram that illustrates the processing of a persist data component 922 of a secure enclave (AE or KDE) using a persistent map, according to some implementations.

As shown, the AE or KDE generates or updates 924 a persistent map, adding, removing or updating a particular key-value set in the map.

After generating 924 the persistent map, the AE or KDE can detect an inbound communication from the host or another event that causes the map to be serialized and committed to storage. Prior to or substantially at the same time as committing the map to storage, the AE or KDE generates 926 hidden data that assists in validating a particular version of the persistent map when the persistent map is later retrieved from the host. Although any suitable type and/or amount of hidden data can be used, in some implementations, the hidden data includes a first identifier of the serialized persistent map and a previously generated second identifier of the most recent persistent map last seen by the client (e.g., a cached identifier of the most recent map provided to a particular client, which can be stored in memory of a particular AE or KDE as a mapping of clients to last-seen identifiers). In some implementations, the identifiers are randomly generated values. In some implementations, the identifiers are hashes of a particular map, which cannot be reverse-engineered. In some implementations, the hidden data includes only one identifier. For example, the hidden data can include a hash of a particular persistent map or another suitable cryptographic value that changes when data stored in the persistent map changes.

After generating 926 hidden data, the AE or KDE provides 928 the persistent map to the host and causes the host to retrievably store the persistent map (e.g., write the persistent map to a disk managed by the host.) The AE or KDE also provides the hidden data to one or more clients and causes the one or more clients, which can be configured (e.g., using a code library provided with the AE or KDE) to perform storage and/or validation operations on the hidden data. In some implementations, to minimize the number of electronic messages and optimize the usage of network bandwidth, the AE or KDE provides the hidden data to a predetermined or randomly generated small sample (e.g., 5, 10, 1%, 5%, etc.) of clients, to clients where a "live" connection and data exchange was detected within a predetermined amount of time (e.g., within 5 minutes, 1 hour, 24 hours, etc.), and so forth. Although hashes and similar hidden data cannot ordinarily be reverse engineered, in some implementations, hidden data is provided only to the universe of clients or a particular client that caused the hidden map to be generated.

If the host rolls back the persistent map, it also rolls back the client-to-hidden data mapping table relationally stored or encoded within the map, and thus creates the opportunity for clients to detect the attack. Accordingly, when an AE or KDE subsequently receives 932 a persistent map from the host, the AE or KDE can validate 934 the persistent map. In some implementations, validating includes comparing the elements of a particular map to a cached version of the map to determine a match. However, if an AE or KDE is restarted 930 prior to receiving the persistent map, this can cause the AE or KDE to lose track of a particular persistent map such that the map is not available in the cache. In some embodiments, the AE or KDE can be caused (e.g., as part of initialization after restart) to request a persistent map, generate hidden data reflective of the state of the map, and provide the hidden data to one or more clients as described above. When the hidden data is provided to the one or more clients, the client(s) can determine whether the hidden data reflects an unexpected change in the state of the persistent map by comparing the hidden data to previously received hidden data. If validated, the client(s) can transmit a confirmation message to the AE or KDE, which can operate 936 on the map data. If not validated, the client(s) can generate and transmit an alert message to the AE or KDE, to a system administrator, or another designated entity. In some implementations, a client can periodically, automatically, and/or unilaterally provide its copy of the hidden data to the AE or KDE. Upon receiving the hidden data, the AE or KDE checks the received copy of the hidden data against the copy received from the host at startup or initialization.

Figure 9C:
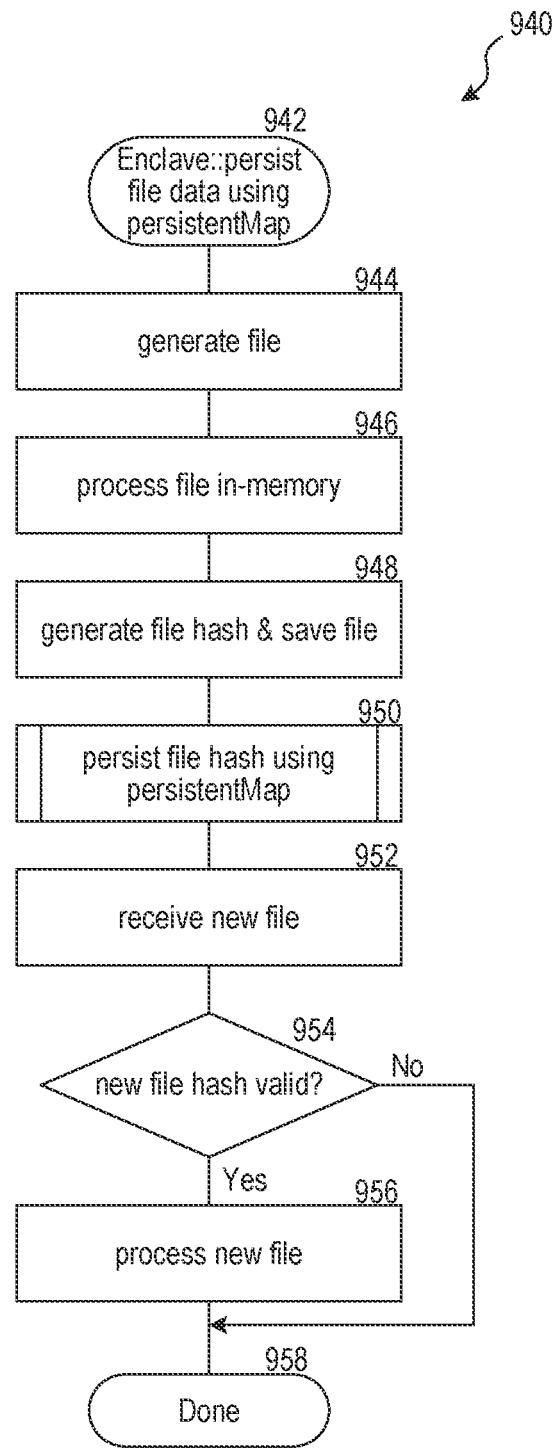
FIG. 9C is a flow diagram that illustrates the processing of a persist file data component of a secure enclave using a persistent map, according to some implementations.

FIG. 9C is a flow diagram that illustrates the processing of a persist file data component 942 of a secure enclave using a persistent map, according to some implementations. A persistent file is generated 944 and processed 946 in-memory by an AE or KDE. Prior to committing the file to a disk, the AE or KDE generates 948 a file hash and saves 950 the file hash to a persistent map as a key-value pair (e.g., as a pair that includes a file identifier as a key and the file hash as the corresponding value). The AE or KDE persists the persistent map as described, for example, in reference to FIG. 9B, and can also generate and share with one or more clients the related hidden data and generate or update the hidden data-to-client map. In some implementations, the file hash stored in persistent map is generated based on an in-memory version of the file, which minimizes the possibility that data in a particular file is compromised.

When receiving 952 a copy of a particular persistent file from a host, the KDE or AE can generate another hash on the received file and validate 954 the new hash by comparing the new hash to the previously generated file hash stored in the key-value map. Successful validation indicates that the received file was not compromised and can be processed 956 according to normal operations. As part of performing validation operations, the KDE or AE can reference the in-memory version of the generated persistent map. If the persistent map is not available, the KDE or AE can AE or KDE can be caused (e.g., as part of initialization after restart) to request a persistent map from the host, generate hidden data reflective of the state of the map, and provide the hidden data to one or more clients for validation of the persistent map. Accordingly, if the one or more clients are not able to validate the persistent map, the KDE or AE can be alerted that the file hash in the persistent map received from the host does not reflect the expected file content (i.e. the file received from the host is compromised).

Computer System

Figure 10:
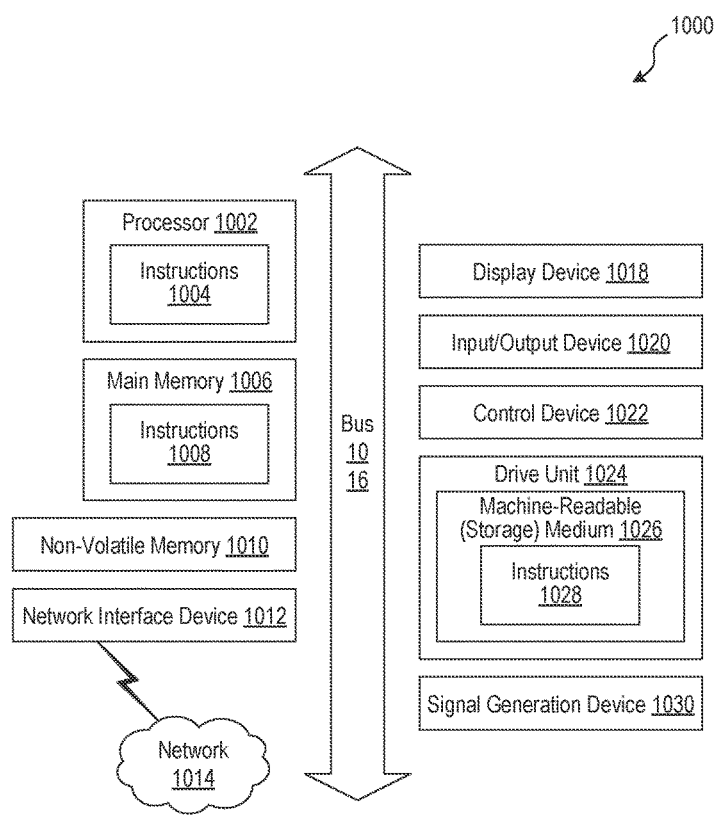
FIG. 10 is a block diagram that illustrates a computing system for key distribution in a secure enclave, according to some implementations.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1000. In some implementation, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real-time, near real-time, or in batch mode.

The network interface device 1012 enables the computer system 1000 to exchange data in a network 1014 with an entity that is external to the computing system 1000 through any communication protocol supported by the computer system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The computing systems on which the methods and systems described above may be implemented may include a central processing unit that supports a TEE, input devices, output devices, storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the methods and systems. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The methods and systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the methods and systems may be implemented in hardware using, for example, an application-specific integrated circuit (ASIC) or field programmable gate array ("FPGA").

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed:

1. A method for securely persisting data of a secure enclave hosted by a host and communicatively coupled to a key derivation provider, the method performed by at least one processor of the secure enclave and comprising:
   generating or updating, by the secure enclave, a persistent file system, wherein the persistent file system is a collection of logical files;
   segmenting, by the secure enclave, at least a portion of the persistent file system into a plurality of sectors;
   providing, by the secure enclave to a key derivation enclave, a key specification;
   obtaining, by the secure enclave, an encryption key from the key derivation enclave, wherein the encryption key is dynamically generated based on the key specification;
   cryptographically protecting, by the secure enclave, each of the plurality of sectors using the encryption key; and
   causing, by the secure enclave, the host to write each of a plurality of cryptographically protected encrypted sectors to a disk as a single physical file.

2. The method of claim 1, wherein the key specification comprises an indicator structured to specify whether subsequent versions of trusted code associated with the secure enclave are allowed to access the persistent file system.

3. The method of claim 1, further comprising providing, by the secure enclave to the key derivation enclave, evidence of trusted code.

4. The method of claim 1, further comprising randomizing, by the secure enclave, an order of the plurality of encrypted sectors prior to causing the host to write the plurality of encrypted sectors to the disk as the single physical file.

5. The method of claim 1, further comprising generating, by the secure enclave, a hash of the persistent file system and storing the hash of the persistent file system in a map persisted using a plurality of client devices communicatively coupled to the secure enclave.

6. The method of claim 5, further comprising receiving, by the secure enclave, an item from the host and validating that the item is a copy of the persistent file system using the hash.

7. The method of claim 1, wherein the secure enclave is one of an application enclave and a key derivation enclave.

8. A computing system comprising a secure enclave having at least one processor, hosted by a host, and communicatively coupled to a key derivation provider, the at least one processor configured to persist data, comprising operations to:
   generate or update, by the at least one processor, a persistent file system, wherein the persistent file system is a collection of logical files;
   segment, by the at least one processor, at least a portion of the persistent file system into a plurality of sectors;
   provide, by the at least one processor to a key derivation enclave, a key specification;
   obtain, by the at least one processor, an encryption key from the key derivation enclave, wherein the encryption key is dynamically generated based on the key specification;
   cryptographically protect, by the at least one processor, each of the plurality of sectors using the encryption key; and cause, by the at least one processor, the host to write each of a plurality of cryptographically protected encrypted sectors to a disk as a single physical file.

9. The system of claim 8, wherein the key specification comprises an indicator structured to specify whether subsequent versions of trusted code associated with the secure enclave are allowed to access the persistent file system.

10. The system of claim 8, further comprising operations to provide, by the at least one processor to the key derivation enclave, evidence of trusted code.

11. The system of claim 8, further comprising operations to randomize, by the at least one processor, an order of the plurality of cryptographically protected encrypted sectors prior to causing the host to write the plurality of cryptographically protected encrypted sectors to the disk as the single physical file.

12. The system of claim 8, further comprising operations to generate, by the at least one processor, a hash of the persistent file system and store the hash of the persistent file system in a map persisted using a plurality of client devices communicatively coupled to the secure enclave.

13. The system of claim 12, further comprising operations to receive, by the at least one processor, an item from the host and validate that the item is a copy of the persistent file system using the hash.

14. The system of claim 8, wherein the secure enclave is one of an application enclave and a key derivation enclave.

15. One or more non-transitory computer-readable media having computer-executable instructions stored thereon, the instructions, when executed by at least one processor of a secure enclave hosted by a host and communicatively coupled to a key derivation provider, performing operations for securely persisting data, the operations comprising:
generating or updating, by the secure enclave, a persistent file system, wherein the persistent file system is a collection of logical files;
segmenting, by the secure enclave, at least a portion of the persistent file system into a plurality of sectors;
providing, by the secure enclave to a key derivation enclave, a key specification;
obtaining, by the secure enclave, an encryption key from the key derivation enclave, wherein the encryption key is dynamically generated based on the key specification;
cryptographically protecting, by the secure enclave, each of the plurality of sectors using the encryption key; and
causing, by the secure enclave, the host to write each of a plurality of cryptographically protected encrypted sectors to a disk as a single physical file.

16. The media of claim 15, wherein the key specification comprises an indicator structured to specify whether subsequent versions of trusted code associated with the secure enclave are allowed to access the persistent file system.

17. The media of claim 15, the operations further comprising providing, by the secure enclave to the key derivation enclave, evidence of trusted code.

18. The media of claim 15, the operations further comprising randomizing, by the secure enclave, an order of the plurality of cryptographically protected encrypted sectors prior to causing the host to write the plurality of cryptographically protected encrypted sectors to the disk as the single physical file.

19. The media of claim 15, the operations further comprising generating, by the secure enclave, a hash of the persistent file system and storing the hash of the persistent file system in a map persisted using a plurality of client devices communicatively coupled to the secure enclave.

20. The media of claim 19, the operations further comprising receiving, by the secure enclave, an item from the host and validating that the item is a copy of the persistent file system using the hash.

* * * * *